July 21, 1936.  F. C. FRANK  2,048,442
WHEEL
Filed July 6, 1931  3 Sheets-Sheet 1

INVENTOR.
FREDERICK C. FRANK
BY
ATTORNEY.

July 21, 1936.  F. C. FRANK  2,048,442
WHEEL
Filed July 6, 1931  3 Sheets-Sheet 2

INVENTOR.
FREDERICK C. FRANK
BY
ATTORNEY.

July 21, 1936.  F. C. FRANK  2,048,442
WHEEL
Filed July 6, 1931  3 Sheets-Sheet 3

INVENTOR.
FREDERICK C. FRANK
BY M. W. McConkey
ATTORNEY.

Patented July 21, 1936

2,048,442

UNITED STATES PATENT OFFICE 2,048,442

WHEEL

Frederick C. Frank, South Bend, Ind., assignor to Bendix Brake Company, South Bend, Ind., a corporation of Illinois Application July 6, 1931, Serial No. 548,862

17 Claims. (Cl. 301—6)

This invention relates to wheels, and particularly to those of the double-disk type suitable for use in heavier-than-air aircraft.

It is the principal object of the invention to provide a very strong, but light, wheel of this type easily fabricated to minimize the cost of manufacture.

Various features of the invention relate to a simple two-part wheel body structure, which parts may be either stampings or forgings, to a cooperating brake drum and body structure each reenforcing the other, to a particular arrangement of body parts and a tying member therefor and to other desirable details of construction and combinations of parts described in detail in the description to follow taken in conjunction with the accompanying drawings, in which.

Figure 3:
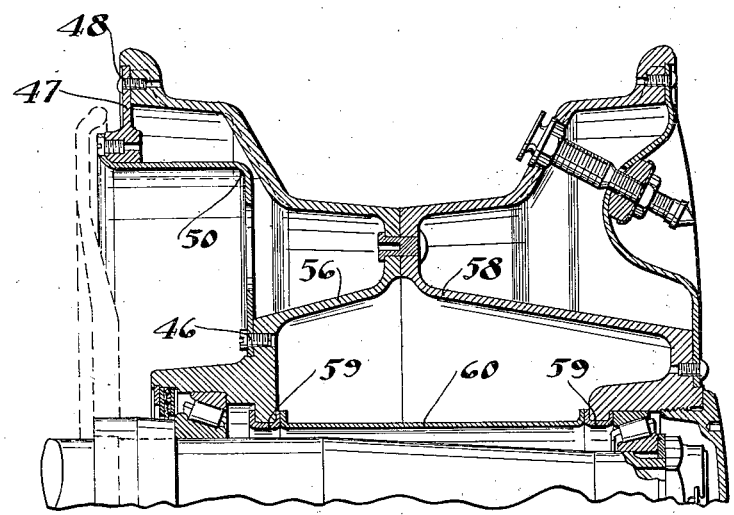
Figure 4:
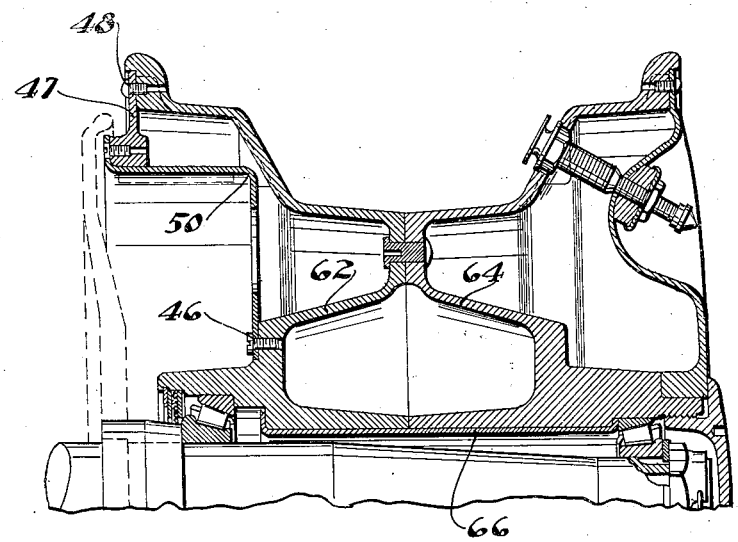
Figure 5:
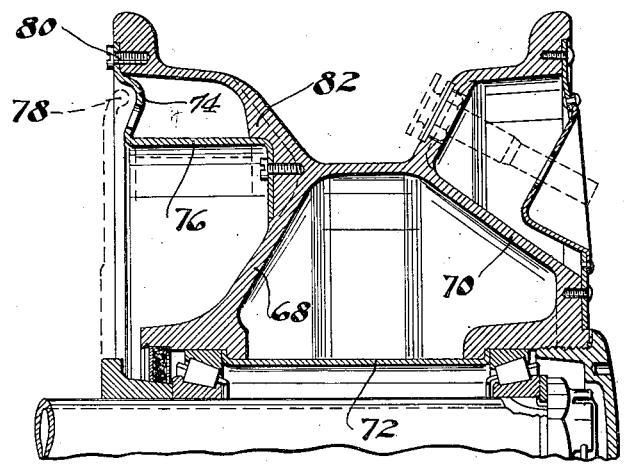
Figure 6:
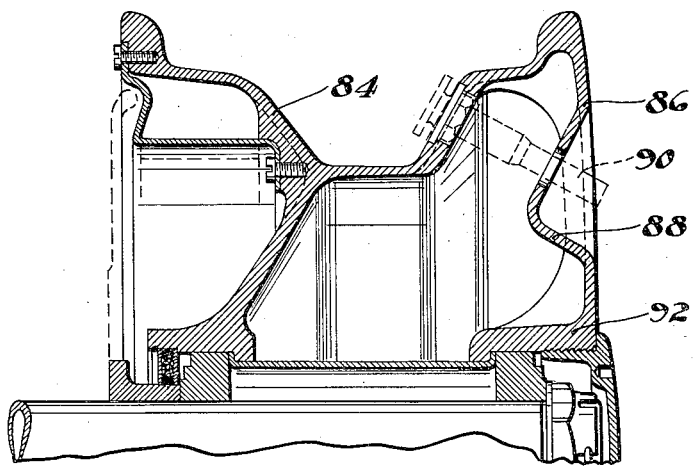

Figures 3 and 4 disclose slightly modified forms of wheel structure;

Figure 5 shows a further modification of wheel structure, the body being of one-piece formation;

Figure 6 discloses another type of one-piece wheel body structure; and—

Figure 7:
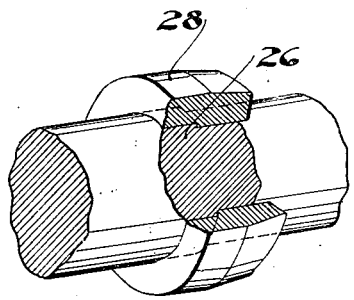

Figure 7 discloses in detail a feature of the axle construction with which my novel wheel cooperates.

Figure 2:
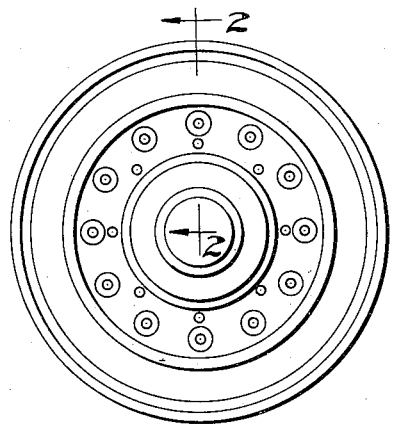
Figure 2 is a side elevation of the wheel of Figure 1.
Figure 1:
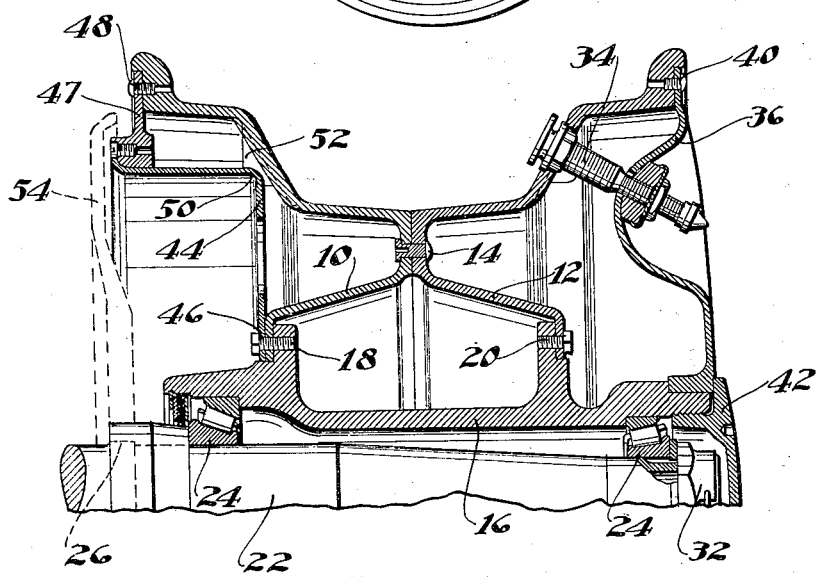
Figure 1 is a sectional view through one form of double-disk wheel structure constituting my invention.

In that embodiment of the invention disclosed in detail in Figure 1 two interchangeable wheel body parts 10 and 12, preferably stampings, are secured together at 14 and detachably secured to a one-piece hub member 16 at 18 and 20. The hub 16 is rotatably mounted on a stub axle member 22 by bearings 24.

According to one feature of the invention the axle is provided with a shoulder 26 (Figure 7) adapted to take the lateral thrust of a spacing collar 28, the latter taking the lateral thrust of the entire wheel unit. Such a structure obviates possible shearing of the axle bolts 30 under the lateral stress from the wheel, developed either during use or during the assembling operation as the axle nut 32 is tightened.

Referring again to the wheel structure, it will be noted that the rim is of the "drop center" type to facilitate installation and removal of the tire, the inflating valve 34 of the latter extending laterally through a stamping 36 serving as a cover plate for the wheel exterior. The cover 36 is detachably secured to the rim at 40 and to the hub by a nut 42, the latter serving the double function of securing the cover in position as well as acting as a closure for the hub opening of the wheel.

A particular feature of the invention relates to the brake drum structure. A stamping 44 constitutes the drum proper and is detachably secured at 46 to the hub and at its outer edge to a support and cover plate 47, the latter being detachably secured to the rim at 48. The plate 47 thus serves as a cover preventing the ingress of foreign matter into the wheel. If desired, the plate may be provided with spaced openings to provide a cooling draft of air throughout the wheel parts. The plate likewise functions to support and reenforce the rim and braking flange of the drum, preventing a "bell mouthing" effect of the latter. The apex or juncture 50 between the braking flange and head of the drum is positioned to contact a plurality of spaced bosses 52 recessed to receive the rounded periphery of the juncture. The bosses, which are preferably integral with the rim, serve: (1) to take the braking thrust; (2) to transmit the load stresses from the rim directly to the drum; and (3) to brake up the cantilever effect of the half rim section between the inner tire bead and the fastenings 14. It will be further noted that the drum is completely housed within the wheel, the brake support plate 54 completing the braking compartment, the whole presenting a compact structure.

In that embodiment of the invention disclosed in Figure 3 the wheel body portions are preferably forgings 56 and 58, the inner peripheries serving, together with stampings 59 and 60, to complete the hub member. The members 59 and 60 function to brace and space the hub portions of the wheel body members.

In Figure 4 there is disclosed wheel body forgings 62 and 64 of like original outline but subsequently machined to provide the hub structure disclosed. A tube 66 serves to tie the body members together. The brake drum structure of Figures 3 and 4 is similar to that disclosed in Figure 1.

As disclosed in Figure 5, the wheel body may be formed of one integral casting, the particular shape of recessed or drop center rim and oppositely extending body portions 68 and 70 facilitating the moulding operation by permitting the employment of a permanent mould with a dry sand core. As with the wheel of Figure 4, the tube 72 serves to tie the hub portions together. A feature of this type of wheel lies in the ogee curve of the securing flange 74 of the brake drum 76, such curvature providing an offset for the peripheral edge 78 of the brake backing plate to present a streamline outer wheel surface. The flange 74 is detachably secured to the rim at 80, and the head of the drum is detachably secured to a boss 82 extending from the wheel body and recessed to snugly nest and receive the drum stamping.

In Figure 6 there is disclosed a modified form of one-piece cast wheel body member, the rim 84 being integrally extended at its outer edge to provide a combined cover plate and wheel body part 86 recessed at 88 to accommodate the inflating tube 90 and shaped at its inner periphery 92 to provide the outer hub portion. The remainder of the wheel of this embodiment is a counterpart of the wheel of Figure 5.

There is thus provided a very simple, compact and economical wheel structure, light of weight yet sufficiently rigid to withstand the severe service incident to the landing and taxying of airplanes.

It will be understood that while the illustrated embodiments of the invention are described as shown, a considerable latitude is to be provided in construction within the range of the appended claims.

I claim:

1. A wheel assembly comprising a two part drop center rim, a flange on each part, a conical wheel body portion integral with each flange and a hub secured to the respective conical wheel body portions.

2. A wheel assembly comprising a two part drop center rim, a conical wheel body portion formed integral with each part, a hub secured to the respective conical wheel body portions, a second body member secured at its outer periphery to one of the tire retaining flanges on the drop center rim and its inner periphery embracing the hub and a nut threaded in the hub having a flange securing the second body member to the hub.

3. A wheel consisting of a one-piece casting characterized by a drop center rim portion, body portions extending from the base of said drop center rim portion in opposite directions to provide conical discs and spaced flanged hub portions and means apart from the one-piece casting for connecting said spaced hub portions together.

4. A wheel and brake assembly comprising a hub a rim and body portions shaped to provide a drop center rim and recessed wheel face, and a brake drum having a drum portion spaced from said rim and a flange at its outer edge and a flange at its inner edge, the outer flange being secured at its periphery to the side of said rim portion, and the inner flange lying within the recess and being secured to said body portion, whereby the drum and rim serve to brace and support one another.

5. A wheel assembly comprising a one-piece rim and body member defining a recess on one face of the wheel, spaced bosses projecting from the rim, a ring secured to the outer edge of said rim and a brake drum housed within said recess, said drum being secured at its peripheries to said ring and wheel body member, respectively, and supported upon said bosses.

6. A wheel member comprising two forgings, each forging comprising a rim, a body and a hub portion, said parts being secured together by fastenings and a tying member to complete the wheel.

7. A wheel comprising corresponding members arranged back to back to provide a drop center rim and conical discs, a hub secured to at least one of the discs, a disc secured to one of the tire retaining flanges on the rim, and a brake drum supported by the disc and one of the conical discs.

8. A wheel comprising two members arranged back to back to provide a drop center rim, a conical radial load carrying disc and a hub, a radial load carrying disc connecting at least one of the tire retaining flanges on the rim with the hub, a disc secured to the other tire retaining flange and a drum connecting the disc with the hub.

9. A wheel comprising a drop center rim member, conical disc body portions extending in opposite directions from the sides of the base of the drop center, each of said disc body portions being adapted to receive a bearing at their inner ends, and a separate tubular element connecting the inner ends of the body portions.

10. A wheel comprising a drop center rim member, conical disc body portions extending in opposite directions from the sides of the base of the drop center, each of said disc body portions being adapted to receive a bearing at their inner ends, a tubular element connecting the inner ends of the body portions, and a brake drum having an inturned flange along one edge secured to a side of the drop center and an outturned flange secured to the outer adjacent edge of the rim.

11. A wheel comprising a drop center rim member, conical disc body portions extending in opposite directions from the sides of the base of the drop center, each of said disc body portions being adapted to receive a bearing at their inner ends, a tubular element connecting the inner ends of the body portions, a brake drum having an inturned flange along one edge secured to a side of the drop center and an outturned flange secured to the outer adjacent edge of the rim, and an end disc member on the other side of said wheel extending between and secured to the other outer rim edge and the inner edge of the body portion and spaced from the body portion.

12. A wheel having a drop center rim, an end disc on one side of the wheel integral with the rim and extending from one edge toward the center, said end disc being adapted to carry a bearing, a conical disc integral with the rim and extending from the other side of the base of the drop center and outwardly forming an annular space, said conical disc being adapted to carry a bearing, a tubular sleeve connecting said discs at their inner ends, and a brake drum in the annular space having an inturned flange secured to the base of the drop center and an outturned flange secured to the other rim edge.

13. A wheel having a drop center rim, a conical disc integral with the rim and extending outwardly from one side of the base of the drop center, said disc having an annular foot ring adapted to hold a bearing and an annular internal shoulder, a second disc member integral with said rim and having an annular ring adapted to carry a bearing and an internal shoulder, and a tubular member connecting said rings and deformed around said shoulders.

14. A wheel having a drop center rim, a conical disc extending from one side of the base of the drop center outwardly, said disc and the adjacent rim edge forming an annular space, a brake drum therein having an inturned flange attached to the drop center and disc and an outturned flange connected to the side of the rim, a second disc on the opposite end of the wheel extending inwardly and spaced from the drop center, and a tubular member having shoulders adjacent each end secured to said discs.

15. A wheel assembly comprising a hub, a one-piece rim and wheel body member secured thereto, the body portion extending laterally from its ber housed within the confines of said recess with the rim, an annular recess, a brake drum member housed within the confines of said recess with the drum portion thereof spaced from the rim portion and detachably secured at its inner and outer peripheries to the wheel body and side of the rim member, whereby the drum and rim serve to brace and support one another.

16. A wheel assembly comprising a hub, a one-piece rim and wheel body member secured thereto, the body portion extending from its junction with the rim portion to provide, with the rim, an annular recess and a brake drum member housed within the confines of said recess, said brake drum member having a drum portion spaced from said rim portion and having a flange on its outer periphery detachably secured to the side of said rim portion and a flange on its inner periphery secured to the body portion whereby the drum and rim serve to support one another.

17. A wheel comprising a single casting including a drop center rim portion, conical load-carrying discs formed integral with the drop center rim portion and having the elements of one conical disc substantially at right angles to the elements of the other conical disc, and spaced-apart independent hub portions formed integral with the conical load-carrying discs.

FREDERICK C. FRANK.

CERTIFICATE OF CORRECTION.

Patent No. 2,048,442.  July 21, 1936.

FREDERICK C. FRANK.

It is hereby certified that error appears in the printed specification of the above numbered patent requiring correction as follows: Page 3, first column, line 5, claim 15, after "its" insert the words and syllable junction with the rim portion to provide, with the rim, an annular recess, a brake drum mem-; lines 7 and 8, same claim, strike out the rim, and annular recess, a brake drum member housed within the confines of said recess with; and that the said Letters Patent should be read with these corrections therein that the same may conform to the record of the case in the Patent Office.

Signed and sealed this 24th day of August, A. D. 1937.

Leslie Frazer (Seal)  Acting Commissioner of Patents.